Patented Dec. 26, 1944

2,365,825

UNITED STATES PATENT OFFICE 2,365,825

PRODUCTION OF N,N-DIALKYLAMINO ALCOHOLS

Lucas P. Kyrides, Webster Groves, Mo., assignor to Monsanto Chemical Company, St. Louis, Mo., a corporation of Delaware No Drawing. Application October 29, 1942, Serial No. 463,809

10 Claims. (Cl. 260—584)

The present invention relates to the production of N,N-dialkylamino alcohols, particularly N,N-diethyl-1-amino-4-pentanol, by the reaction of secondary amines with polyhydric alcohols.

The principal object of the present invention is to provide an improved method for the production of N,N-dialkylamino alcohols, such as N,N-diethyl-1-amino-4-pentanol. Another object of the invention is to provide a method of producing N,N-diethyl-1-amino-4-pentanol in high yields from readily available chemical substances. Further objects and advantages of the invention, some of which are referred to specifically hereinafter, will be apparent to those skilled in the art.

Heretofore no general method has been available for the preparation of N,N-dialkylamino alcohols directly from polyhydric alcohols. It has been known that ethylene oxide and alkyl-substituted ethylene oxides could be reacted with secondary amines (dialkyl amines) to yield a dialkylaminoalkanol. For example, Knorr and Matthes, Berichte, 1901, vol. 34, page 3482, reacted ethylene oxide with dimethylamine to obtain 2-dimethylaminoethanol (1-hydroxy-2-dimethylaminoethane), according to the following equation:

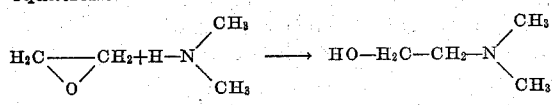

The method has been further extended to substituted ethylene oxides (see German Patent No. 199,148; Frdl. IX, 975). This method, however, is capable of yielding only dialkylamino alcohols in which the dialkylamino group and the hydroxyl group are on adjacent carbon atoms. It, furthermore, is not the equivalent of the reaction of polyhydric alcohols with secondary amines, since polyhydric alcohols are not substantially reactive under conditions which are favorable for the reaction of ethylene oxides.

Another general method of preparing dialkylamino alcohols which has been applied generally consists in reacting a halogenated alcohol with a secondary amine, in which reaction the halogen is substituted by the dialkylamino radical of the secondary amine, according to the following general reaction:

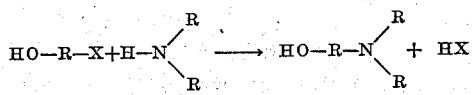

This reaction is also limited in its application since halogenated alcohols embodying the halogen and hydroxyl radicals on the desired carbon atoms are not readily prepared. In preparing halogenated alcohols, all possible isomers are generally formed, hence the yield of any particular isomer is generally but a small fraction of the total yield.

A dialkylamino alcohol such as N,N-diethyl-1-amino-4-pentanol, which may be represented as:

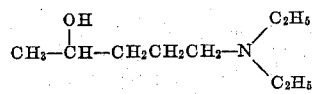

cannot be prepared by the first of the foregoing methods, namely, the reaction of a secondary amine with an ethylene oxide; when prepared from the corresponding halogenated alcohol, the yield is low, based on the raw material used for the preparation of the halogenated alcohol. The compound has usually been prepared by indirect methods (see, for example, Schulemann et al., Patent No. 1,747,531).

N,N-diethyl-1-amino-4-pentanol can readily be converted by reaction with ammonia to 5-diethylamino-2-aminopentane (4-diethylamino-1-methylbutylamine, N',N'-diethyl-1, 4-pentanediamine, $$CH_3-CH(NH_2)-CH_2CH_2CH_2-N(C_2H_5)_2$$

which is an intermediate for the production of antimalarials such as aminoquin (also called plasmochin, pamaquine and plasmoquine), 6-methoxy-8-(4-diethylamino-1-methyl-butyl-butylamino)-quinoline (see Schulemann et al., Patent No. 1,747,531) and quinacrine (also called atabrine and mepacrine), 2-methoxy-7-chloro-10-(4-diethylamino-1-methyl-butylamino)- acridine (see Mietzsch and Mauss, Patent No. 2,113,-357; also Knunyantz et al., Bull. acad. sci. U. R. S. S., Classe sci. math. nat., 1934, pages 165–176; Chem. Abs., 1934, vol. 28, page 4837 and Drozdov, J. Gen. Chem. (U. S. S. R.), 1938, vol. 8, pages 937–42 and 1192–3; Chem. Abs., 1938, vol. 33, pages 1330 and 4251).

I have found that N,N-diethyl-1-amino-4-pentanol can be prepared in good yields from 1,4-pentanediol by heating a reaction mixture of 1,4-pentanediol and diethylamine in the presence of a metal hydrogenation catalyst at temperatures within the range of approximately 120° to 180° C. The reaction proceeds apparently as follows:

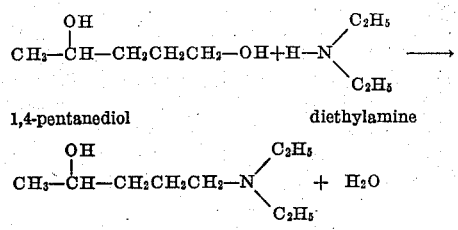

N,N-diethyl-1-amino-4-pentanol

It was unexpected that the reaction would proceed without substantial substitution of the hydroxyl group in the 4 position of 1,4-pentanediol.

Whether this preferential amination of the primary carbinol radical of the diol is due to steric hindrance or to other factors, I am unable to state. The reaction is general, as I have found, polyhydric alcohols which contain both a primary and secondary carbinol radical react with dialkylamines (secondary amines) to effect a substitution by the dialkylamino radical of one hydroxyl radical of the primary carbinol ($-CH_2OH$) radical, in preference to a hydroxyl radical of a secondary carbinol ($-CHOH-$) radical of the alcohol.

1,4-pentanediol is a readily obtainable substance and by means of my process is readily converted to N,N-diethyl-1-amino-4-pentanol, which may in turn be converted by reaction with ammonia to give 5-diethylamino-2-aminopentane or by reaction with thionyl chloride to give 5-diethylamino-2-chloropentane (see Schulemann et al., Patent No. 1,747,531), both of which are convenient intermediates for the production of antimalarials. These reactions are represented as follows:

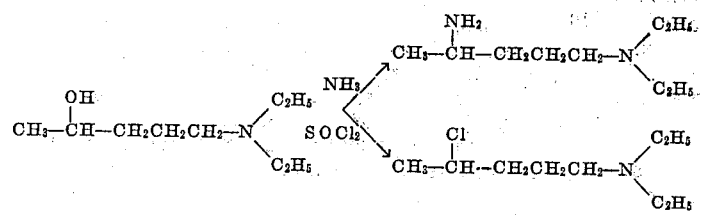

Preferred methods of practicing the process of my invention are illustrated in the examples which follow:

EXAMPLE 1

A steel autoclave provided with a stirrer was charged with 300 grams of 1,4-pentanediol, 250 grams (350 ml.) of diethylamine and 20 grams of a nickel catalyst prepared by the thermal decomposition of nickel formate in mineral oil. The catalyst was washed with ethyl alcohol before addition to the charge in the autoclave. The charge was then heated with stirring under pressure for a period of 4½ hours at a temperature varying within the range of 160° to 180° C. The charge was then cooled, the catalyst was separated by filtration and the catalyst-free reaction mixture was subjected to distillation. The following distillation fractions were collected in the order indicated:

I. *Recovered amines and water.*—This fraction included all material which distilled up to a temperature of approximately 160° C. The major portion of the amines distilled between 54° and 74° C.

II. *Trapped fraction.*—This fraction was that which came over after fraction I and up to a distilling temperature of approximately 100° C. at a pressure of 30 to 35 mm. of mercury. It was collected in a cooled trap.

III. *Forerunnings.* — This material distilled after fraction II had been separated and consisted of that portion which had a boiling point up to 118° C. at a pressure of 35 mm. of mercury.

IV. *N,N-diethyl-1-amino-4-pentanol.* — This was the desired product and was collected within the distilling range of 118° to 120° C. at a pressure of 35 mm. of mercury.

V. *Recovered 1,4-pentanediol.* — This fraction was collected between the distilling range of 120° to 140° C. at 35 mm., the pressure at the end of this fraction being reduced to about 8 to 10 mm. to distill over any of the material remaining in the column.

VI. *Residue.*—The fraction remained after the foregoing fractions were collected.

The yields of the various fractions obtained in this example were as follows:

| Fraction | Weight in grams | Percent original pentanediol |
|---|---|---|
| I | | |
| II | | |
| III | 10 | 3 |
| IV | 115 | 25 |
| V | 126 | 42 |
| VI | 37 | 12 |
| Percent pentanediol recovery | | 82 |

The values in the column "per cent original pentanediol" correspond to the percentage which the particular fraction represents in terms of pentanediol originally charged. In this calculation only fractions III to VI, inclusive, were considered, all of which, except fraction IV (which was N,N-diethyl-1-amino-4-pentanol), were considered to be pentanediol or equivalent weight for weight of original pentanediol. The weight of fraction IV was converted to weight of pentanediol, assuming the fraction to be pure N,N-diethyl-1-amino-4-pentanol, by using the stoichiometrical factor 0.654; this calculated weight of pentanediol was used for obtaining the corresponding "per cent original pentanediol," which also represents percentage of the theoretical yield of N,N-diethyl-1-amino-4-pentanol based on the amount of 1,4-pentanediol used. The "per cent pentanediol recovery" represents the total percentages of pentanediol accounted for in this manner.

EXAMPLE 2

Example 1 was repeated by using, however, another batch of a similar nickel catalyst, which was not washed with ethanol, 500 ml. instead of 350 ml. of diethylamine, and heating at 180° C. for a period of 6 hours. The yield of product was somewhat lower than in Example 1, and more higher boiling materials were formed, as is indicated in the following results, which are reported as in Example 1:

| Fraction | Weight in grams | Percent original pentanediol |
|---|---|---|
| I | 267 | |
| II | 42 | |
| III | 7.4 | 2 |
| IV | 95 | 21 |
| V | 116 | 39 |
| VI | 49 | 16 |
| Percent pentanediol recovery | | 78 |

EXAMPLE 3

Example 1 was repeated with the following changes:

Fifteen (15) grams, instead of 20 grams, of another batch of a more active nickel catalyst prepared by the thermal decomposition of nickel formate in which oil was used.

Temperature of heating was 150° C.

Period of heating was 10 hours.

The results, reported as in Example 1, were as follows:

| Fraction | Weight in grams | Per cent original pentanediol |
|---|---|---|
| I | 154 | |
| II | 37 | |
| III | 10 | 3 |
| IV | 133 | 29 |
| V | 132 | 44 |
| VI | 46 | 15 |
| Per cent pentanediol recovery | | 91 |

*Amination of N,N-diethyl-1-amino-4-pentanol*

The amination of N,N-diethyl-1-amino-4-pentanol, to produce 5-diethylamino-2-aminopentane, can be conducted as follows:

A steel autoclave provided with a stirrer is charged with 450 grams of N,N-diethyl-1-amino-4-pentanol, 100 grams anhydrous ammonia and 15 grams of a nickel catalyst. This charge is heated with stirring for 10 hours at a temperature of 200° C. under pressure. The products are separated by distillation and recovered, and their weights and characteristics are approximately as follows:

| | Fraction | Distillation range | Weight |
|---|---|---|---|
| | | | Grams |
| I | 5-diethylamino-2-aminopentane | 97°–102°/34 mm. | 119 |
| II | Recovered N,N-diethyl-1-amino-4-pentanol | 102°–117°/34 mm. | 153 |

Although the foregoing examples relate specifically to the reaction of 1,4-pentanediol with diethylamine, the process is applicable generally to the reaction of polyhydric alcohols which embody at least one primary carbinol and at least one secondary carbinol radical with secondary aliphatic amines. Typical examples of such polyhydric alcohols which may be used in the process of this invention are propylene glycol (1,2-propanediol), 1,2-butanediol, 1,3-butanediol, 1,3-pentanediol, 1,4-pentanediol, etc. All of the foregoing specifically named polyhydric alcohols are hydroxy-1-alkanols containing at least one terminal primary carbinol radical and at least one secondary carbinol radical. Aliphatic secondary amines which may be used in the process are dimethylamine, diethylamine, di-n-propylamine, diisopropylamine, dibutylamines and the like. The reaction involved in the process comprises a substitution of a hydroxyl of a primary carbinol radical in preference to a hydroxyl of a secondary carbinol radical of the polyhydric alcohol.

Nickel hydrogenation catalysts are the preferred catalysts, although other metal hydrogenation catalysts such as platinum, palladium, cobalt, copper and similar catalysts may be used. The catalyst may be deposited upon a carrier, if desired, as is well understood in the art. Although the reaction does not involve a hydrogenation as such, yet it is facilitated by catalysts which are known to promote hydrogenation reactions. Some of the foregoing specified catalysts are more reactive than others and temperatures and other conditions of reaction are preferably adjusted to compensate for these differences in activity.

The reaction normally proceeds at temperatures within the range of approximately 120° C. to approximately 180° C. In order to shorten the reaction period, higher temperatures (for example, up to about 250° C.) may be used. The optimum conditions of reaction, that is, the optimum temperature and period of reaction will vary somewhat with the various polyhydric alcohols and secondary amines, their relative proportions and the amounts which are being subjected to reaction. The results reported in the examples are not to be understood to represent the best yields of which the method is capable, however.

Inasmuch as the foregoing description comprises preferred embodiments of the invention, it is to be understood that the invention is not limited thereto and that changes and modifications may be made therein without departing substantially from the invention, which is defined in the appended claims.

I claim:

1. The process of producing an N,N-dialkylamino alcohol from an aliphatic polyhydric alcohol having at least one primary carbinol radical and at least one secondary carbinol radical, which comprises reacting said polyhydric alcohol with a secondary aliphatic amine, in the presence of a metal hydrogenation catalyst at a temperature above approximately 120° C., whereby a hydroxyl radical of a primary carbinol radical of the polyhydric alcohol is substituted by the dialkylamino radical in preference to the hydroxyl radical of a secondary carbinol radical.

2. The process of producing an N,N-dialkylamino alcohol from an aliphatic polyhydric alcohol having at least one primary carbinol radical and at least one secondary carbinol radical, which comprises reacting said polyhydric alcohol with a secondary aliphatic amine, in the presence of a metal hydrogenation catalyst at a temperature within the range of approximately 120° to 250° C., whereby a hydroxyl radical of a primary carbinol radical of the polyhydric alcohol is substituted by the dialkylamino radical in preference to the hydroxyl radical of a secondary carbinol radical.

3. The process of producing an N,N-dialkylamino alcohol from an aliphatic polyhydric alcohol having at least one primary carbinol radical and at least one secondary carbinol radical, which comprises reacting said polyhydric alcohol with a secondary aliphatic amine, in the presence of a metal hydrogenation catalyst at a temperature within the range of approximately 120° to 180° C., whereby a hydroxyl radical of a primary carbinol radical of the polyhydric alcohol is substituted by the dialkylamino radical in preference to the hydroxyl radical of a secondary carbinol radical.

4. The process for the production of N,N-diethyl-1-amino-4-pentanol which comprises reacting 1,4-pentanediol with diethylamine in the presence of a metal hydrogenation catalyst at a temperature above approximately 120° C.

5. The process for the production of N,N-diethyl-1-amino-4-pentanol which comprises reacting 1,4-pentanediol with diethylamine in the presence of a metal hydrogenation catalyst at a temperature within the range of approximately 150° to 250° C.

6. The process for the production of N,N-diethyl-1-amino-4-pentanol which comprises reacting 1,4-pentanediol with diethylamine in the presence of a nickel hydrogenation catalyst at a temperature within the range of approximately 120° to 180° C.

7. The process for the production of N,N-diethyl-1-amino-3-butanol which comprises reacting 1,3-butanediol with diethylamine at an elevated temperature in the presence of a metal hydrogenation catalyst.

8. The process for the production of N,N-diethyl-1-amino-3-butanol which comprises reacting 1,3-butanediol with diethylamine in the presence of a metal hydrogenation catalyst at a temperature above approximately 120° C.

9. The process for the production of N,N-diethyl-1-amino-3-butanol which comprises reacting 1,3-butanediol with diethylamine in the presence of a nickel hydrogenation catalyst at a temperature within the range of approximately 120° to 180° C.

10. The process of producing an N,N-dialkylamino alcohol from an aliphatic polyhydric alcohol having at least one primary carbinol radical and at least one secondary carbinol radical which comprises reacting in the liquid phase said polyhydric alcohol with a secondary aliphatic amine in the presence of a metal hydrogenation catalyst at a temperature above 120° C., whereby a hydroxyl radical of a primary carbinol radical of the polyhydric alcohol is substituted by the dialkylamino radical.

LUCAS P. KYRIDES.